United States Patent
Gaut et al.

(10) Patent No.: US 10,538,045 B2
(45) Date of Patent: Jan. 21, 2020

(54) METHOD AND APPARATUS FOR MOLDING NON-PNEUMATIC WHEELS

(71) Applicants: Compagnie Generale des Etablissements Michelin, Clermont-Ferrand (FR); Michelin Recherche et Technique S.A., Granges-Paccot (CH); Robert Gaut, Easley, SC (US); Brian D. Wilson, Greenville, SC (US); Karl Mohrmann, Easley, SC (US)

(72) Inventors: Robert Gaut, Easley, SC (US); Brian D. Wilson, Greenville, SC (US); Karl Mohrmann, Easley, SC (US)

(73) Assignee: Compagnie Generale des Etablissements Michelin, Clermont-Ferrand (FR)

( * ) Notice: Subject to any disclaimer, the term of this patent is extended or adjusted under 35 U.S.C. 154(b) by 307 days.

(21) Appl. No.: 15/536,803

(22) PCT Filed: Dec. 8, 2015

(86) PCT No.: PCT/US2015/064433
§ 371 (c)(1),
(2) Date: Jun. 16, 2017

(87) PCT Pub. No.: WO2016/100006
PCT Pub. Date: Jun. 23, 2016

(65) Prior Publication Data
US 2017/0368774 A1    Dec. 28, 2017

Related U.S. Application Data

(63) Continuation of application No. PCT/US2014/070784, filed on Dec. 17, 2014.

(51) Int. Cl.
*B29D 30/02* (2006.01)
*B29C 33/40* (2006.01)
(Continued)

(52) U.S. Cl.
CPC ............ *B29D 30/02* (2013.01); *B29C 33/405* (2013.01); *B29C 41/047* (2013.01);
(Continued)

(58) Field of Classification Search
CPC ..... B29D 30/02; B29C 33/405; B29C 41/047; B29C 45/1459; B60C 7/102; B60C 7/105;
(Continued)

(56) References Cited

U.S. PATENT DOCUMENTS 4,669,964 A    6/1987  Amano
4,832,098 A    5/1989  Palinkas
(Continued)

FOREIGN PATENT DOCUMENTS

CN    103009909 A    4/2013
EP    2955009 A1    12/2015
(Continued)

OTHER PUBLICATIONS

International Search Report for PCT/US2014/070812 dated Mar. 31, 2015.
(Continued)

*Primary Examiner* — Ryan J. Walters
(74) *Attorney, Agent, or Firm* — Dority & Manning, P.A.

(57) ABSTRACT

A method and apparatus for molding non-pneumatic wheels is provided. The exemplary method and apparatus allow for the use of the same molding system to manufacture wheels with different hub constructions. Different configurations of
(Continued)

removable mold elements are utilized within the same molding system to provide wheels with different hub constructions.

9 Claims, 6 Drawing Sheets

(51) Int. Cl.
| | |
|---|---|
| *B29C 41/04* | (2006.01) |
| *B29C 45/14* | (2006.01) |
| *B60C 7/10* | (2006.01) |
| *B60C 1/00* | (2006.01) |
| *B60C 7/00* | (2006.01) |

(52) U.S. Cl.
CPC ......... *B29C 45/1459* (2013.01); *B60C 7/102* (2013.01); *B60C 7/105* (2013.01); *B60B 2310/204* (2013.01); *B60C 2001/0091* (2013.01); *B60C 2007/005* (2013.01)

(58) Field of Classification Search
CPC ...... B60C 2007/005; B60C 2001/0091; B60B 2310/204
See application file for complete search history.

(56) References Cited

U.S. PATENT DOCUMENTS

| | | | |
|---|---|---|---|
| 4,945,962 | A | 8/1990 | Pajtas |
| 5,645,870 | A | 7/1997 | Larsen |
| 7,201,194 | B2 | 4/2007 | Rhyne et al. |
| 8,567,461 | B2 | 10/2013 | Williams et al. |
| 9,248,697 | B2 | 2/2016 | Iwamura |
| 9,616,703 | B2 | 4/2017 | Nishida et al. |
| 2004/0159385 | A1 | 8/2004 | Rhyne |
| 2004/0187996 | A1 | 9/2004 | Grah |
| 2008/0073014 | A1 | 3/2008 | Abe |
| 2009/0107596 | A1* | 4/2009 | Palinkas ............. B29D 30/02 152/209.1 |
| 2010/0200131 | A1 | 8/2010 | Iwase |
| 2011/0024008 | A1 | 2/2011 | Manesh |
| 2012/0038206 | A1 | 2/2012 | Chadwick |
| 2012/0205017 | A1 | 8/2012 | Endicott |
| 2012/0234445 | A1 | 9/2012 | Manesh |
| 2013/0209595 | A1 | 8/2013 | Speck |
| 2013/0284329 | A1 | 10/2013 | Wilson |
| 2013/0287882 | A1* | 10/2013 | Wilson ............... B29D 30/02 425/425 |
| 2014/0034219 | A1 | 2/2014 | Chadwick et al. |
| 2014/0070439 | A1 | 3/2014 | Martin |
| 2014/0083581 | A1* | 3/2014 | Schaedler ............. B60B 9/26 152/5 |
| 2014/0159280 | A1 | 6/2014 | Caterpillar |
| 2014/0251518 | A1 | 9/2014 | Abe et al. |
| 2018/0043647 | A1* | 2/2018 | Gaut .................. B29D 30/02 |

FOREIGN PATENT DOCUMENTS

| | | |
|---|---|---|
| WO | WO 2005/063505 A1 | 7/2005 |
| WO | WO 2012/030519 A2 | 3/2012 |
| WO | WO 2013/130047 | 9/2013 |
| WO | WO2016/100004 A1 | 6/2016 |
| WO | WO2016/100005 A1 | 6/2016 |

OTHER PUBLICATIONS

International Search Report for PCT/US15/64426 dated Feb. 2, 2016.
International Search Report for PCT/US15/64428 dated Apr. 21, 2016.
International Search Report for PCT/US15/64433 dated Feb. 16, 2016.
International Search Report for PCT/US14/070784 dated Apr. 1, 2015.
International Search Report for PCT/US14/070796 dated Mar. 31, 2015.

* cited by examiner

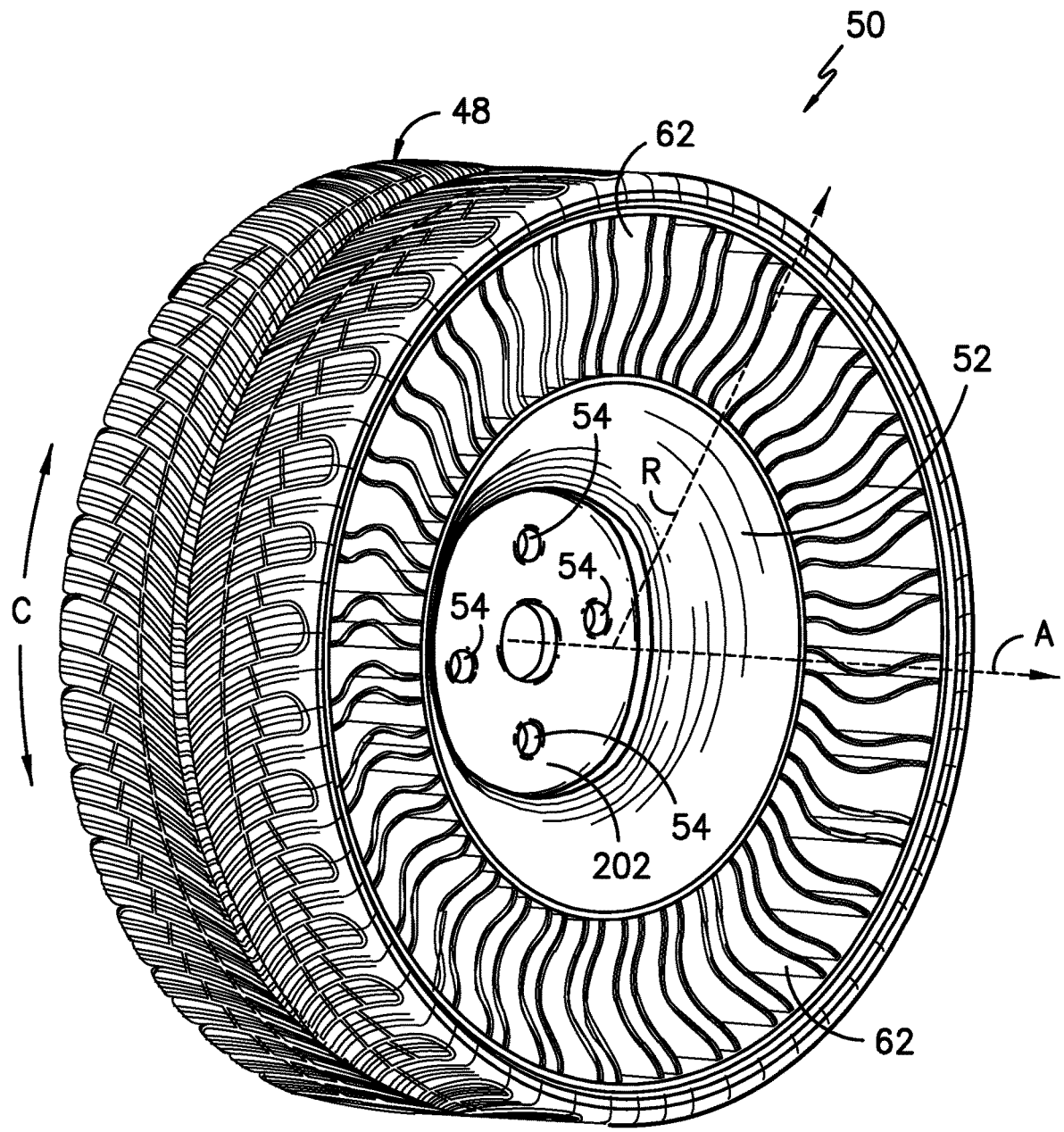
FIG. -1-

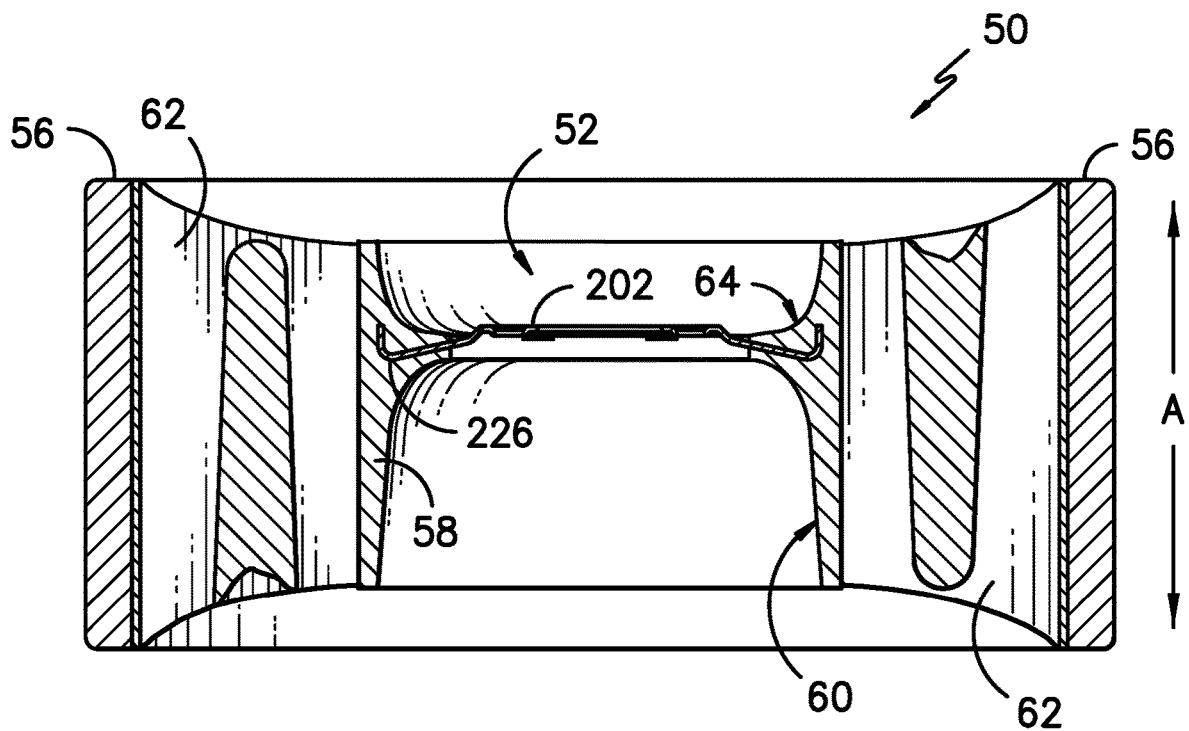
FIG. -2-
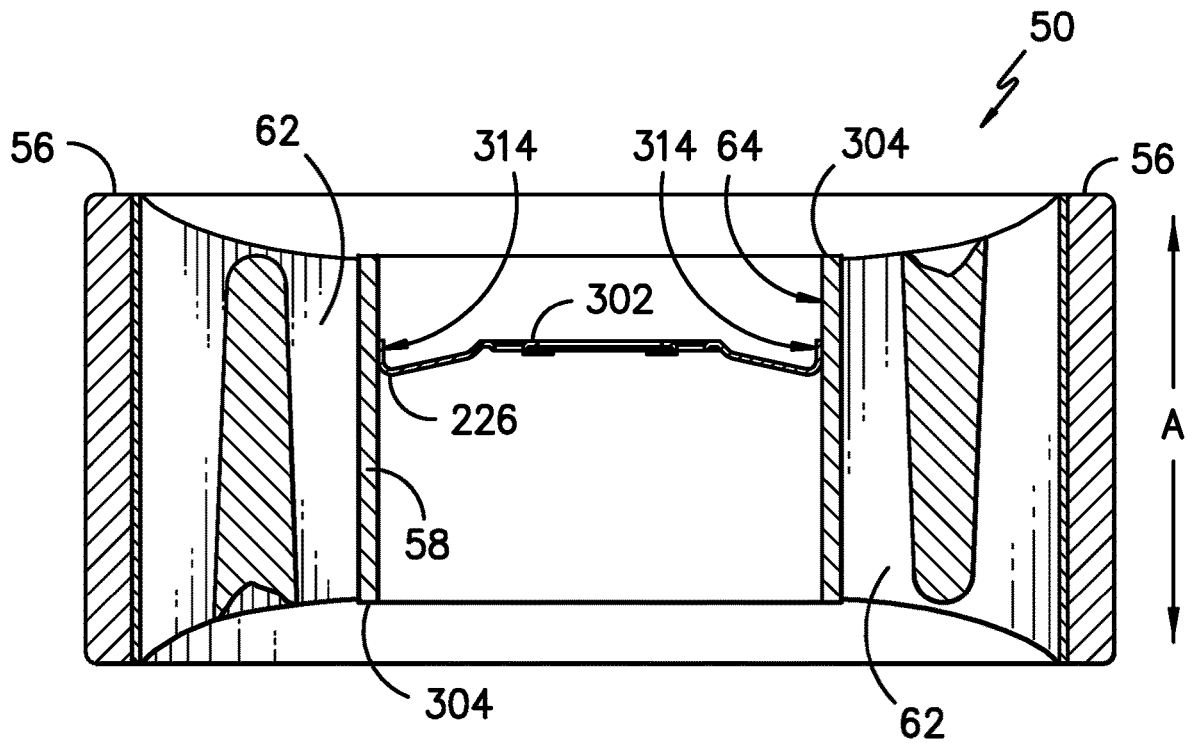
FIG. -3-

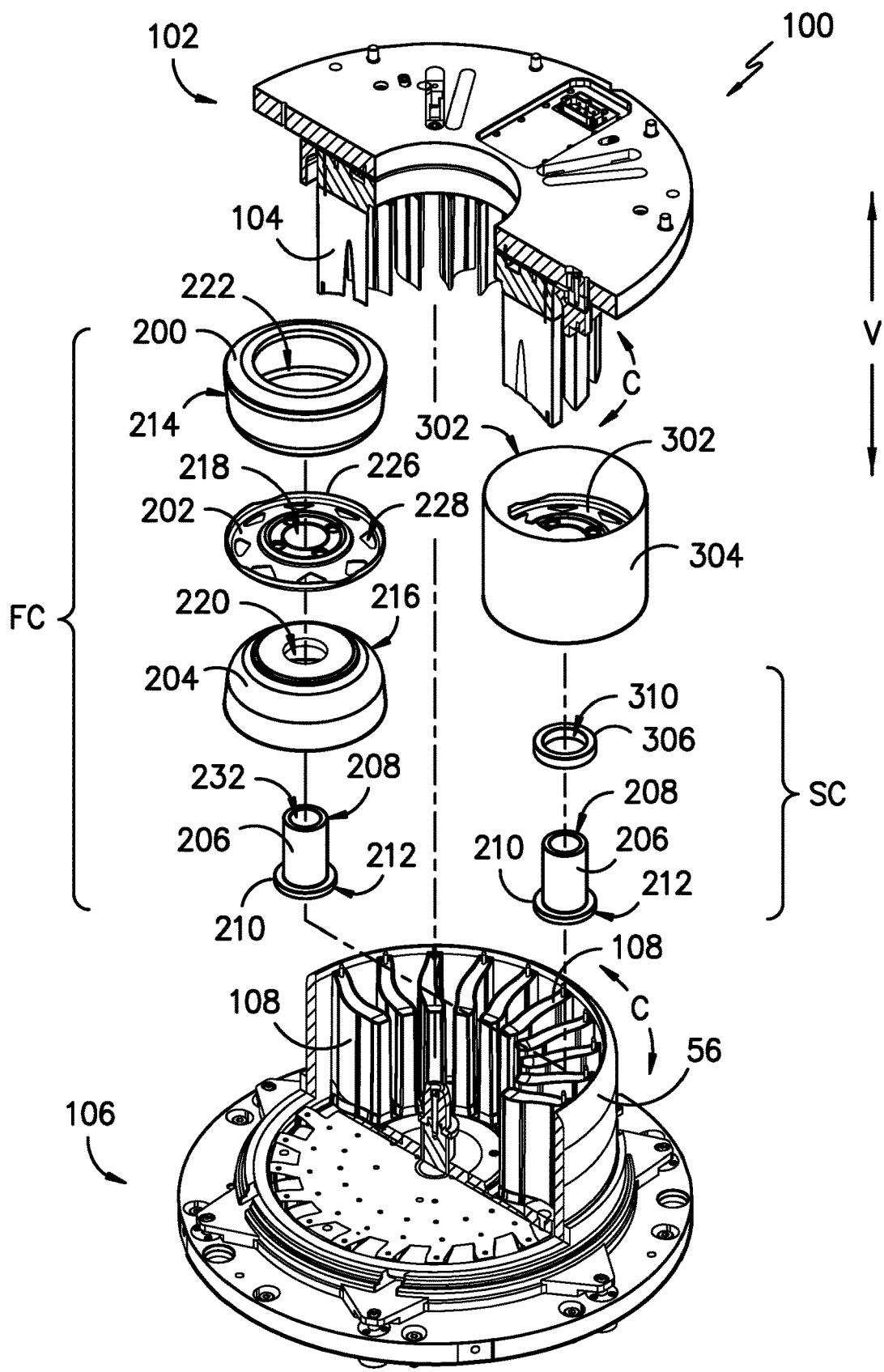
FIG. -4-

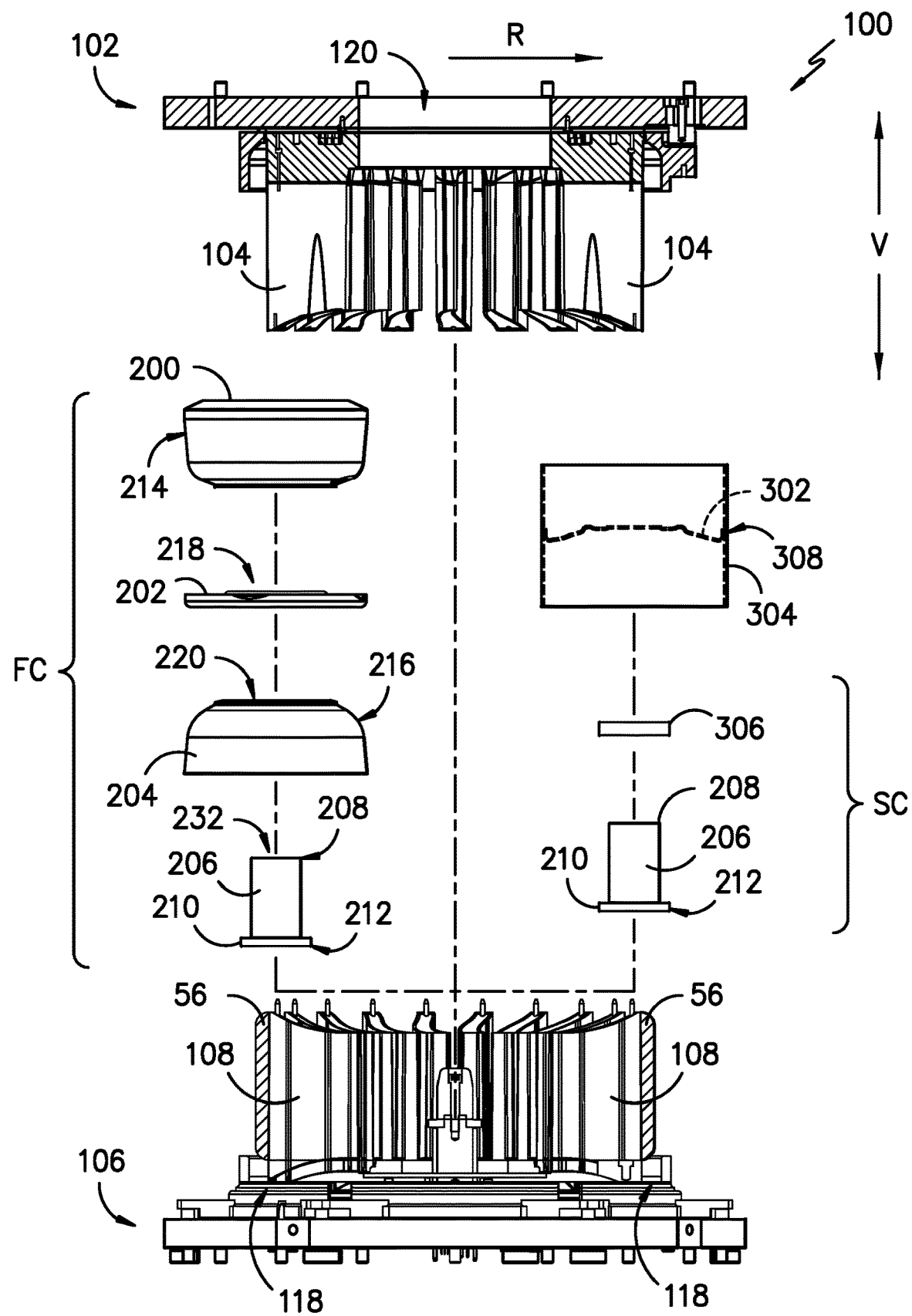
FIG. -5-

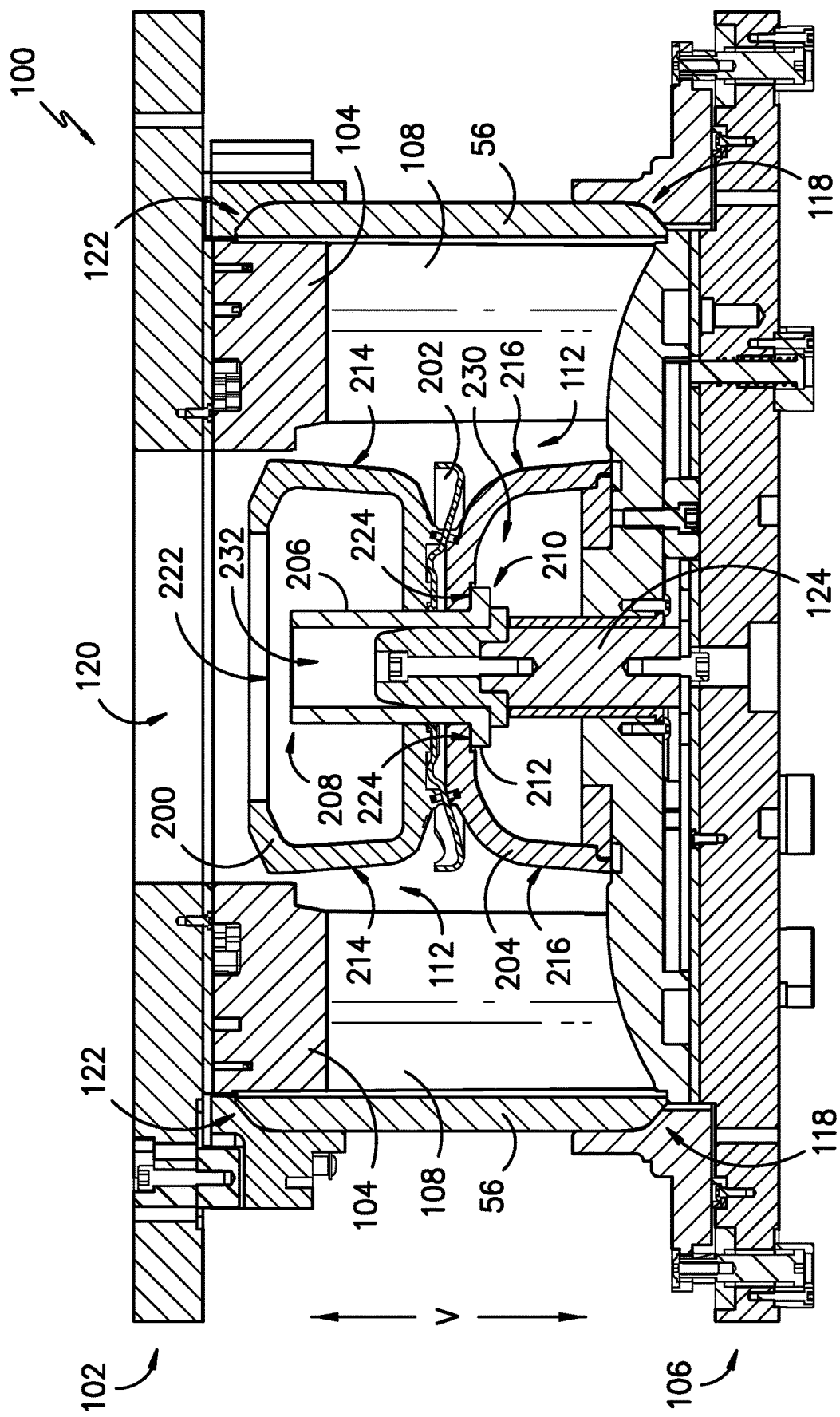
FIG. -6-

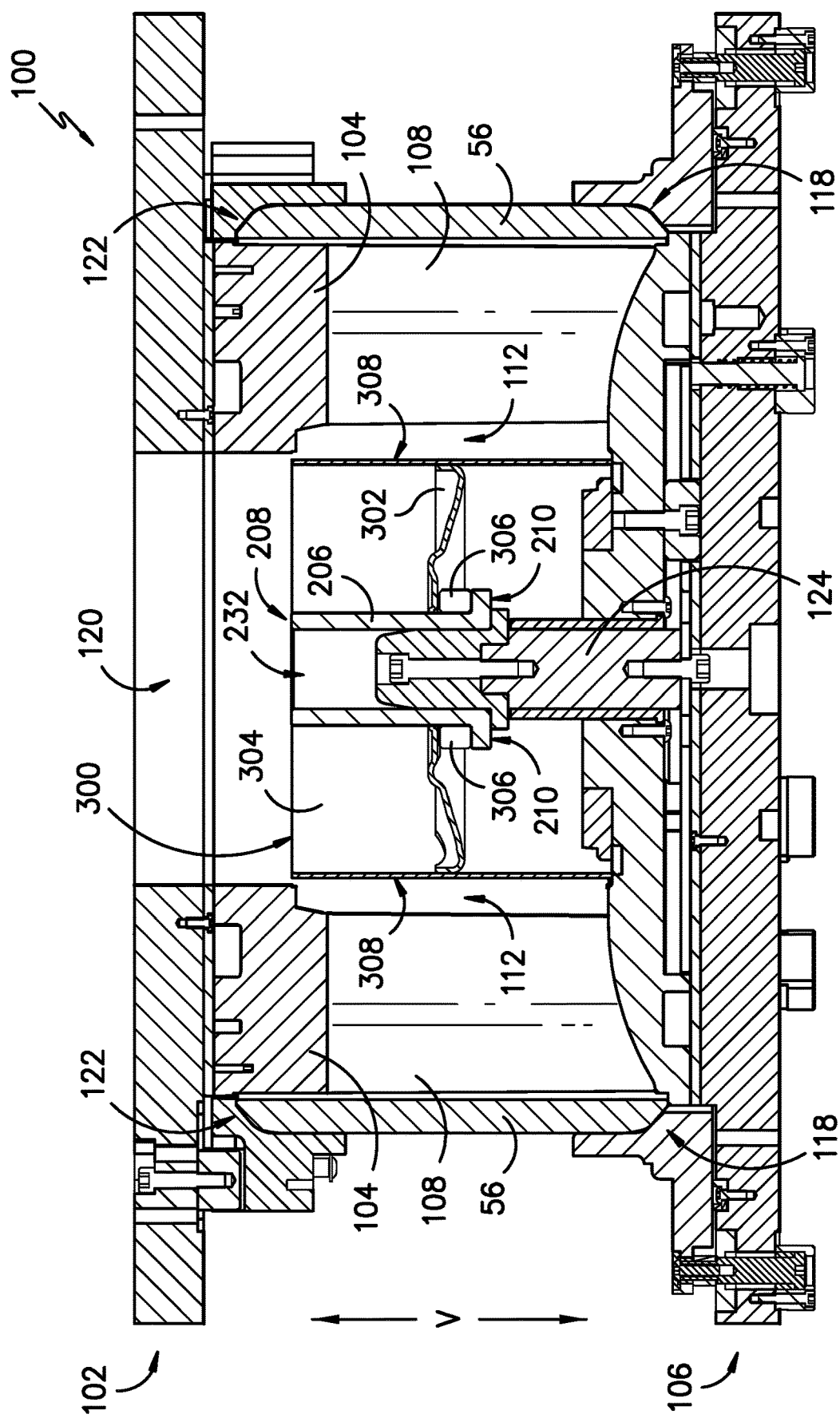
FIG. -7-

METHOD AND APPARATUS FOR MOLDING NON-PNEUMATIC WHEELS

PRIORITY STATEMENT

The present application claims priority to PCT/US14/070784, filed Dec. 17, 2014 in the United States Receiving Office.

FIELD OF THE INVENTION

The subject matter of the present disclosure relates generally to a method and apparatus for molding non-pneumatic wheels.

BACKGROUND OF THE INVENTION

Non-pneumatic wheel constructions and their benefits are described in e.g., U.S. Pat. Nos. 6,769,465; 6,994,134; 7,013,939; and 7,201,194. Some non-pneumatic tire constructions propose incorporating a shear band, embodiments of which are described in e.g., U.S. Pat. Nos. 6,769,465 and 7,201,194, which are incorporated herein by reference. Such non-pneumatic tires provide advantages in tire performance without relying upon a gas inflation pressure for support of the loads applied to the tire.

In one example of a non-pneumatic wheel, a compliant band with a ground contacting portion can be connected with a plurality of web elements extending radially from a center element or hub. For certain constructions, such non-pneumatic wheel may be formed by open cast molding in which a material such as e.g., polyurethane is poured into a mold that forms all or part of the non-pneumatic tire. Reinforcements in various parts of the non-pneumatic wheel may be molded in place. For example, one or more inextensible reinforcements such as cords may be molded in place in the compliant band.

The molds used to cast such non-pneumatic wheel constructions are a substantial part of the overall expense of manufacturing. Multiple, intricate features must be used to mold e.g., the individual web elements that extend between the hub and compliant band. Typically, the molds are carefully machined from metal having a high thermal conductivity such as e.g., aluminum.

The hub is used to connect the non-pneumatic wheel with a vehicle. The hub may be connected directly to the vehicle or may be connected through another component such as a wheel center. A variety of different constructions or configurations may be used for the hub, which may be constructed in whole or in part from one or more metals. Because of the associated expense of creating the molds, a requirement of different molds for different hub configurations is undesirable.

Accordingly, a method and apparatus for molding non-pneumatic wheels would be useful. More particularly, a method and apparatus that allows use of the same mold for manufacturing non-pneumatic wheels with different hub configurations would be particularly beneficial.

SUMMARY OF THE INVENTION

The present invention provides a method and apparatus for molding a non-pneumatic wheel. The exemplary method and apparatus allow for the use of the same molding system to manufacture wheels with different hub constructions. More particularly, multiple configurations of removable mold elements are utilized within the same molding system to provide wheels with different hub constructions. The present invention can provide a savings in manufacturing cost by avoiding the requirement of a different mold for each hub configuration. Additional objects and advantages of the invention will be set forth in part in the following description, or may be apparent from the description, or may be learned through practice of the invention.

In one exemplary embodiment, the present invention provides an adjustable molding system for a non-pneumatic wheel, the non-pneumatic wheel including a plurality of tension-transmitting web elements extending between a load support band and a hub, the non-pneumatic wheel defining axial, radial, and circumferential directions. The molding system includes an upper mold portion having a plurality of upper web forming elements spaced apart around the circumferential direction. A lower mold portion has a plurality of lower web forming elements spaced apart around the circumferential direction and are configured to receive the upper web forming elements when the molding system is in a closed position to form the tension transmitting web elements during the molding process. The upper mold portion and lower mold portion form an internal cavity when the molding system is in the closed position.

This exemplary molding system also includes a first configuration of removable mold elements for positioning within the internal cavity. The first configuration includes an upper mold bowl configured to form a surface of the wheel and a lower mold bowl supporting the upper mold bowl and configured to form a surface of the wheel. The lower mold bowl is supported on the bushing when the first configuration is positioned within the internal cavity. A removable bushing is positionable onto the lower mold portion. The molding system also includes a second configuration of removable mold elements for positioning within the internal cavity. The second configuration includes a spacer ring and a removable bushing positioned onto the lower mold portion. The spacer ring is received onto the bushing when the second configuration is positioned within the internal cavity. The first and second configurations are interchangeable within the molding system.

In another exemplary aspect, the present invention provides a method of molding a non-pneumatic wheel using a molding system that includes an upper mold portion and a lower mold portion that can be selectively joined to form an internal cavity. The exemplary steps include positioning a removable bushing and a lower mold bowl onto the lower mold portion; placing a compliant, load supporting band onto the lower mold portion; inserting an upper mold bowl onto the lower mold bowl; closing an upper mold portion onto the lower mold portion; and heating the lower mold bowl, upper mold bowl, and load supporting band to a predetermined temperature. A molding material may be poured into the molding system to form the non-pneumatic wheel.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a perspective view of an exemplary non-pneumatic wheel of the present invention.

FIG. 2 illustrates a cross-sectional view along a meridian plane of the exemplary wheel of FIG. 1.

FIG. 3 illustrates a cross-sectional view along a meridian plane of another exemplary wheel of the present invention.

FIG. 4 is a partial cross-sectional and exploded perspective view of an exemplary molding system as may be used to manufacture the non-pneumatic wheels of FIGS. 1, 2, and 3.

FIG. 5 is a partial cross-sectional and exploded side view of an exemplary molding system as may be used to manufacture the non-pneumatic wheels of FIGS. 1, 2, and 3.

FIG. 6 is a cross-sectional view of the exemplary molding system of FIGS. 4 and 5 shown in a closed position with an exemplary first configuration of removable mold elements as may be used to manufacture the exemplary wheel of FIGS. 1 and 2.

FIG. 7 is a cross-sectional view of the exemplary molding system of FIGS. 4 and 5 shown in a closed position with an exemplary second configuration of removable mold elements as may be used to manufacture the exemplary wheel of FIG. 3.

DETAILED DESCRIPTION

For purposes of describing the invention, reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment, can be used with another embodiment to yield a still further embodiment. Thus, it is intended that the present invention covers such modifications and variations as come within the scope of the appended claims and their equivalents.

As used herein, the following definitions apply:

"Meridian plane" is a plane within which lies the axis of rotation of the tire or wheel. FIGS. 2 and 3, for example, are cross-sections of an exemplary non-pneumatic wheel of the present invention taken along a meridian plane.

The "radial direction" or "R" is perpendicular to the axis of rotation of the tire or wheel.

The "axial direction" or "A" is parallel to the axis of rotation of the tire or wheel and perpendicular to the radial direction.

The "circumferential direction" follows the circumference of the tire or wheel and is denoted with "C".

FIG. 1 provides a perspective view of an exemplary non-pneumatic wheel 50 that can be manufactured using the present invention while FIG. 2 provides a cross-sectional view of wheel 50 taken along a meridian plane. The present invention is not limited to the particular shape, size, or appearance of the wheels shown in the figures. As will be understood using the teachings disclosed herein, wheels of other shapes, sizes, and appearances may be used as well.

Non-pneumatic wheel 50 includes a central mounting disk 202 this is provided with a series of apertures 54 through which threaded lugs or other fasteners may be inserted in order to mount wheel 50 onto a vehicle. Other mounting configurations may be used as well. Non-pneumatic wheel 50 also includes a compliant, load supporting band 56 positioned radially outward of a hub 52 and positioned concentrically with hub 52. A tread 48 may be formed on, or provided as part of, load supporting band 56. For example, a tread band may be adhered to load supporting band 56.

A plurality of tension-transmitting web elements 62 extend along the radial direction R between hub 52 and load supporting band 56. Web elements 62 are adjacent to one another and spaced apart about circumferential direction C of wheel 50. Web elements 62 may have other shapes and configurations from what is shown in FIG. 1. Load supporting band 56 supports loads transmitted to non-pneumatic wheel 50 when mounted to a vehicle using mounting disk 202. The load is transmitted by tension through web elements 62 to compliant band 56.

By way of example, load supporting band 56 may include a shear band having an inner reinforcing band, outer reinforcing band, and a shear layer positioned therebetween. The shear layer may be constructed e.g., of an elastomeric material such as e.g., natural and synthetic rubbers, polyurethanes, foamed rubbers and polyurethanes, segmented copolyesters, and block co-polymers of nylon. The reinforcing bands may include reinforcements constructed from e.g., essentially inextensible cord reinforcements embedded in an elastomeric coating. Such reinforcements may include e.g., any of several materials suitable for use as tire belt reinforcements in conventional tires such as monofilaments or cords of steel, aramid or other high modulus textiles. Other constructions and materials may be used as well.

For the exemplary embodiment of FIGS. 1 and 2, hub 52 is connected with a central mounting disk 202 embedded within an outer toroidal portion 58 of hub 52 using an exemplary molding system as described herein. By way of example, central mounting disk 202 may be constructed from a metal whereas hub 52 may be constructed from a polymeric material into which disk 202 can be molded. The polymeric material in the present embodiment, also referred to herein as the molding material, may be any suitable polymeric material such as e.g., a natural or synthetic rubber, polyurethane, foamed rubber and foamed polyurethane, segmented copolyesters, and block co-polymers of nylon.

Mounting disk 202 may be provided with one or more features to assist in securing disk 202 to outer toroidal portion 58 of hub 52. For example, disk 202 may include a lip or bend 226 extending circumferentially about disk 202. Mounting disk 202 may also include openings 228 (FIG. 4) through which material may extend during the molding process. Other features may be used as well.

FIG. 3 provides a cross-sectional view of another exemplary embodiment of wheel 50 taken along a meridian plane where the same reference numerals denote the same or similar features as used in the embodiment of FIGS. 1 and 2. For this exemplary embodiment, wheel 50 also includes a central mounting disk 302. However, mounting disk 302 is not embedded within hub 304. Instead, mounting disk 302 is attached to hub 50 along a flange 314. By way of example, central mounting disk 302 and hub 304 may be constructed of one or more metals and welded or cast together.

FIG. 4 provides a perspective view of an exemplary embodiment of an adjustable molding system 100 for a non-pneumatic wheel while FIG. 5 provides a side view of the same system 100. Molding system 100 has a first configuration FC of removable mold elements that may be used to mold the exemplary wheel 50 of FIGS. 1 and 2. Molding system 100 also has a second configuration SC of removable mold elements that may be used to mold the exemplary wheel 50 of FIG. 3. In addition, first configuration FC and second configuration SC are interchangeable with each other within molding system 100 as will be further described in order to manufacture wheels with different hub configurations. In FIGS. 4 and 5, first configuration FC and second configuration SC are each shown in an exploded, non-sectional view to show their sequencing relative to each other within molding system 100. Only one configuration, FC or SC, is used at time during the molding of a non-pneumatic wheel.

Molding system 100 includes an upper mold portion 102 and a lower mold portion 106. In FIGS. 1 and 2, the upper mold portion 102 and part of the lower mold portion 106 are shown in sectional views to more clearly reveal certain interior components. Along with the FC and SC configurations of interchangeable mold elements, upper and lower mold portions 102 and 106 can be used to make the exemplary embodiment FIGS. 1 and 2 as well as the exemplary embodiment of FIG. 3, which allows for a substantial savings in production costs by e.g., the avoidance individual molds for each embodiment of the non-pneumatic wheels.

Upper mold portion 102 includes a plurality of upper web forming elements 104 spaced apart along circumferential direction C. Lower mold portion 106 includes a plurality of lower web forming elements 108 also spaced apart along circumferential direction C. When molding system 100 is in a closed position as depicted in the cross-sectional views of FIGS. 6 and 7, web forming elements 104 and 106 can be used to mold tension transmitting elements 62 of either of the previously described exemplary embodiments of non-pneumatic wheel 50. More particularly, in the closed position, the lower web forming elements 108 interlock with the upper web forming elements 104 to provide spaces therebetween for the formation of the web-like, tension transmitting elements 62 during the molding process in which a molding material such as e.g., polyurethane is poured into molding system 100. In other embodiments of system 100, web forming element 104 and 108 may meet to each form only a portion (e.g., half) of the web elements 62. Other constructions may be used as well.

Referring to FIGS. 4, 5, and 6, the first configuration FC, used for the exemplary embodiment of FIGS. 1 and 2, includes an upper mold bowl 200 having an upper mold bowl forming surface 214. During molding operations, surface 214 forms part of the inner surface 64 of outer toroidal portion 58. A lower mold bowl 204 supports the upper mold bowl 200. Lower mold bowl 204 provides a lower mold bold forming surface 216 that also forms part of the inner surface 60 of outer toroidal portion 58 during molding operations.

Central mounting disk 202 is held in place between upper mold bowl 200 and lower mold bowl 204 when molding system 100 is in a closed position shown in FIG. 6. It should be understood that central mounting disk 202 is part of non-pneumatic wheel 50 and is not part of first configuration FC of removable mold elements. Central mounting disk 202 is positioned to be embedded within hub 52 when molding material is poured into molding system 100 and fills the internal chamber or cavity 112 formed by mold portions 102 and 106 when molding system 100 is in the closed position.

First configuration FC also includes a bushing 206 configured for receipt of lower mold bowl 204 and upper mold bowl 200. More particularly, when molding system 100 is in a closed position with first configuration FC positioned in internal cavity 112 as shown in FIG. 6, bushing 206 projects along vertical direction V into an opening 220 in lower mold bowl 204, through opening 218 in central mounting disk 202, and into an opening 222 in upper mold bowl 200.

A central opening 232 of bushing 206 is used to position bushing 206 onto a pilot 124 extending from lower mold portion 106. Bushing 206 has a top end 208 and a bottom end 212. An annular rib 210 is formed on bottom end 212 and extends along circumferential direction C. Rib 210 supports lower mold bowl 205 on pilot 124. As shown in FIG. 6, rib 210 is received into a recess 224 formed in the interior 230 of lower mold bowl 205. During molding operations as described below, bushing 206 can be used to lift lower mold bowl 204, mounting disk 202, and upper mold bowl 200 simultaneously to remove from, or place the same into, molding system 100. For example, a robotic arm can be used to grasp bushing 206 by top end 208 and position as needed.

Additionally, when in the closed position as shown in FIG. 6, load support band 56 is positioned between upper mold portion 102 and lower mold portion 106. Further, in the closed position, upper mold bowl 200 and lower mold bowl 204 are positioned concentrically within load support band 56. Similarly, upper web forming elements 204 and lower web forming elements 108 are positioned within load support band 56 when molding system 100 is in the closed position. As such, during molding operations, load support band 56 forms part of the mold when molding material is poured into the internal cavity 112 formed by the closing of molding apparatus 100. This allows the molding material to join with load support band 56 to form non-pneumatic wheel 50.

An exemplary method of using molding system 100 to manufacture exemplary non-pneumatic wheel depicted in FIGS. 1 and 2 will now be described. Using the teachings disclosed herein, it will be understood that other methods with different steps or a different sequence of steps may be used in still other exemplary methods of the present invention.

In one exemplary method, the molding surfaces of molding system 100 are cleaned. After a preheating step, the molding surfaces are treated with a coating to help release molding material after molding and curing. Bushing 206 can be used to lift lower mold bowl 204, mounting disk 202, and upper mold bowl 200 simultaneously and place onto the lower mold portion 106 of molding system 100. Load support band 56 is placed within a complementary groove 118 defined by lower mold portion 106. The upper mold portion 102 is then placed onto lower mold portion 106 with support band 56 received into complementary groove 122.

The molding system 100 is heated again until e.g., a predetermined temperature is reached. Next, a molding material such as e.g., polyurethane or another material as previously described is poured into molding system 100. More specifically, the molding material is poured through e.g., opening 120 and allowed to fill internal cavity 112 formed by the closed position of molding system 100. The mold material fills the interstitial spaces formed by the upper and lower mold portions 102 and 106 to form wheel 50. During the pouring step, after the pouring step, or at the same time as the pouring step, molding assembly 100 is rotated to e.g., help distribute the molding material within molding system 100 and remove bubbles that may be entrained in the molding material.

Molding system 100 is then placed into an oven for additional heating so as to cure the molding material. Once the molding material is cured, molding system 100 can be removed from the oven. Upper mold portion 102 can then be removed and non-pneumatic wheel 50 can be de-molded.

Bushing 206 can be used to remove the cast wheel 50 along with the removable mold elements from lower mold portion 106.

Referring to FIGS. 4, 5, and 7, the second configuration SC can be used to mold the exemplary wheel of FIG. 3 and is interchangeable with first configuration FC. Second configuration SC includes a spacer ring 306 and bushing 206. When mold system 100 is in the closed position shown in FIG. 7, mounting disk 302 rests upon spacer ring 306. Spacer ring 206 defines an opening 310 through which bushing 206 projects along vertical direction V. Pilot 124 projects along vertical direction V through opening 232 in bushing 206.

Mounting disk 302 is located within hub 304. Hub 304 is supported upon lower mold portion 106. When molding system 100 is in the closed position shown in FIG. 7, a spring loaded pour cap (not shown) pushes down onto the top edge 300 of canned hub 304 to seat the hub onto the lower mold portion 106.

Additionally, when in the closed position shown in FIG. 7, load support band 56 is positioned between upper mold portion 102 and lower mold portion 106. Specifically, load support band 56 is received into complementary grooves 118 and 122. Further, in the closed position, cap 300 and hub 304 are positioned concentrically within load support band 56. Similarly, upper web forming elements 204 and lower web forming elements 108 are positioned within load support band 56 when molding system 100 is in the closed position. As such, during molding operations, the outer surface 308 of hub 304 and the inner surface of load support band 304 forms part of the mold when molding material is poured into the internal cavity 112 formed by the closing of molding apparatus 100. This allows the molding material to join with the external surface 308 of hub 304 and load support band 56 to form non-pneumatic wheel 50. Hub 304 and mounting disk 302 form part of wheel 50 and are not part of the second configuration SC of removable mold elements.

As will be understood using the teachings disclosed herein, methods similar to that previously described for first configuration FC may be used to mold the exemplary wheel 50 of FIG. 3 using the second configuration SC. As previously stated, configurations FC and SC are interchangeable. Either configuration may be removed from molding system 100 to allow for installation of the other configuration depending upon the wheel hub configuration that will be manufactured.

Multiple bushings 206 may be used with the present invention. For example, different configurations of wheels 50 may use bushings 206 of different sizes and shapes. In addition, to facilitate manufacture, multiple bushings 206 may be used. For example, during manufacture, several bushings 206 may be used at the same time so that as mold system 100 is unloaded with a molded wheel 50, another assembly of e.g., bushing 206, bowls 200 and 204, along with disk 202 may be loaded into mold assembly 100 in preparation for molding another wheel 50. Other methods may be used as well.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art using the teachings disclosed herein.

What is claimed is:

1. An adjustable molding system for a non-pneumatic wheel, the non-pneumatic wheel including a plurality of tension-transmitting web elements extending between a load support band and a hub, the non-pneumatic wheel defining axial, radial, and circumferential directions, the molding system comprising:
   an upper mold portion having a plurality of upper web forming elements spaced apart around the circumferential direction;
   a lower mold portion having a plurality of lower web forming elements spaced apart around the circumferential direction and configured to receive the upper web forming elements when the molding system is in a closed position to form the tension transmitting web elements during a molding process, wherein the upper mold portion and lower mold portion form an internal cavity when the molding system is in the closed position;
   a first configuration of removable mold elements for positioning within the internal cavity, the first configuration comprising
      a removable bushing positioned onto the lower mold portion;
      an upper mold bowl configured to form a surface of the wheel;
      a lower mold bowl supporting the upper mold bowl and configured to form a surface of the wheel, wherein the lower mold bowl is supported on the bushing when the first configuration is positioned within the internal cavity;
   a second configuration of removable mold elements for positioning within the internal cavity, the second configuration comprising
      a spacer ring; and
      a removable bushing positioned onto the lower mold portion and onto which the spacer ring is received when the second configuration is positioned within the internal cavity;
   wherein the first and second configurations are interchangeable within the molding system.

2. The adjustable molding system of claim 1, wherein the bushing extends vertically into an opening in the lower mold bowl and into an opening in the upper mold bowl.

3. The adjustable molding system of claim 2, wherein the bushing includes top end and a bottom end, the bottom end defining an annular rib onto which the lower mold bowl is received.

4. The adjustable molding system of claim 2, wherein the lower mold bowl defines an annular recess into which the annular rib is received.

5. The adjustable molding system of claim 2, further comprising a pilot extending from the lower mold portion, wherein the lower mold bowl is removably received onto the pilot.

6. The adjustable molding system of claim 1, further comprising a mounting disk positioned between the upper mold bowl and the lower mold bowl when the molding system is in the closed position with the first configuration in the internal cavity.

7. The adjustable molding system of claim 1, wherein the load support band is positioned between the upper mold portion and the lower mold portion when the molding system is in the closed position with the first configuration in the internal cavity.

8. The adjustable molding system of claim 7, wherein the upper mold bowl and the lower mold bowl are positioned concentrically within the load support band when the molding system is in the closed position.

9. The adjustable molding system of claim 8, wherein the upper and lower web forming elements are positioned within the load support band when the molding system is in lathe closed position.

* * * * *